United States Patent
Perriello et al.

(10) Patent No.: US 6,835,312 B2
(45) Date of Patent: *Dec. 28, 2004

(54) METHOD AND APPARATUS FOR TREATMENT OF SEPTIC SYSTEMS WITH ALKANE-UTILIZING BACTERIA

(75) Inventors: Felix Anthony Perriello, Norwood, MA (US); George A. DiCesare, Norwood, MA (US); Ralph J. Perriello, Lynnfield, MA (US)

(73) Assignee: Global Biosciences, Inc., North Attleborough, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/324,663

(22) Filed: Dec. 20, 2002

(65) Prior Publication Data

US 2003/0234217 A1 Dec. 25, 2003

Related U.S. Application Data

(63) Continuation-in-part of application No. 10/308,607, filed on Dec. 2, 2002, which is a continuation-in-part of application No. 09/924,791, filed on Aug. 8, 2001, now Pat. No. 6,669,846.
(60) Provisional application No. 60/344,947, filed on Dec. 21, 2001, and provisional application No. 60/291,165, filed on May 15, 2001.

(51) Int. Cl.[7] .................................................. C02F 3/00
(52) U.S. Cl. ...................................................... 210/610
(58) Field of Search ........................................ 210/610

(56) References Cited

U.S. PATENT DOCUMENTS

| | | | |
|---|---|---|---|
| 3,242,071 A | | 3/1966 | Walker |
| 3,616,216 A | | 10/1971 | Wegner |
| 3,741,393 A | * | 6/1973 | Estes et al. ............. 210/195.4 |
| 3,846,290 A | | 11/1974 | Raymond |
| 3,969,446 A | | 7/1976 | Franklin, Jr. |
| 4,033,763 A | | 7/1977 | Markels, Jr. |
| 4,111,808 A | | 9/1978 | Fair |
| 4,328,175 A | | 5/1982 | Roeckel et al. |
| 4,454,077 A | | 6/1984 | Litz |
| 4,522,723 A | | 6/1985 | Kauffman et al. |
| 4,529,701 A | * | 7/1985 | Seely .......................... 435/244 |
| 4,645,603 A | | 2/1987 | Frankl |
| 4,695,378 A | | 9/1987 | Ackman et al. |
| RE32,562 E | | 12/1987 | Litz |
| 4,713,343 A | | 12/1987 | Wilson, Jr. et al. |
| 4,737,289 A | | 4/1988 | Castaldi et al. |
| 4,789,478 A | | 12/1988 | Revis et al. |
| 4,790,940 A | | 12/1988 | Castaldi et al. |

(List continued on next page.)

FOREIGN PATENT DOCUMENTS

| | | |
|---|---|---|
| DE | 4142063 | 12/1991 |
| EP | 0098138 | 1/1984 |

OTHER PUBLICATIONS

Wilson et al., "Biotransformation of Trichloroethylene in Soil," *Applied and Environmental Microbiology*, Jan., 1985; p. 242–243, vol. 49, No. 1.

Nelson et al., "Aerobic Metabolism of Trichloroethylene by a Bacterial Isolate," *Applied and Environmental Microbiology*, Aug. 1986, p. 383–384, vol. 52.

(List continued on next page.)

*Primary Examiner*—Robert A. Hopkins
(74) *Attorney, Agent, or Firm*—Alan G. Towner, Esq.; Pietragallo, Bosick & Gordon

(57) ABSTRACT

Septic systems are treated with alkane-utilizing bacteria. Alkanes such as butane are injected into septic system wastewater in order to enhance growth of alkane-utilizing bacteria which degrade wastes. Aerobic processes may be achieved by injecting an oxygen-containing gas into the septic system. Alternatively, anaerobic processes may be used. The alkane and oxygen-containing gas may be injected at any suitable stage of the septic system, such as injection into a septic tank, drainfield and/or grease or oil interceptor tank.

34 Claims, 1 Drawing Sheet

U.S. PATENT DOCUMENTS

| | | |
|---|---|---|
| 4,956,080 A | 9/1990 | Josefik |
| 5,006,250 A | 4/1991 | Roberts et al. |
| 5,037,551 A | 8/1991 | Barkley et al. |
| 5,057,221 A | 10/1991 | Bryant et al. |
| 5,061,405 A | 10/1991 | Cheng |
| 5,062,956 A | 11/1991 | Lupton et al. |
| 5,073,309 A | 12/1991 | Bousquet et al. |
| 5,085,809 A | 2/1992 | Stirling |
| 5,169,532 A | 12/1992 | Whitlock |
| 5,277,815 A | 1/1994 | Beeman |
| 5,302,286 A | 4/1994 | Semprini et al. |
| 5,314,076 A | 5/1994 | La Place et al. |
| 5,316,940 A | 5/1994 | Georgiou et al. |
| 5,326,703 A | 7/1994 | Hazen et al. |
| 5,337,820 A | 8/1994 | Jenneman et al. |
| 5,342,769 A | 8/1994 | Hunter et al. |
| 5,354,688 A | 10/1994 | Francis et al. |
| 5,384,048 A | 1/1995 | Hazen et al. |
| 5,397,481 A | 3/1995 | Mattus |
| 5,441,887 A | 8/1995 | Hanson et al. |
| 5,494,576 A | 2/1996 | Hoppe et al. |
| 5,512,479 A | 4/1996 | Steffan |
| 5,529,693 A | 6/1996 | Yano et al. |
| 5,660,730 A | 8/1997 | Lucchese et al. |
| 5,678,632 A | 10/1997 | Moses et al. |
| 5,733,067 A | 3/1998 | Hunt et al. |
| 5,789,236 A | 8/1998 | Jenneman |
| 5,814,514 A | 9/1998 | Steffan et al. |
| 5,833,855 A | 11/1998 | Saunders |
| 5,888,396 A | 3/1999 | Perriello |
| 5,916,491 A | 6/1999 | Hills |
| 5,925,290 A | 7/1999 | Hills |
| 6,051,130 A | 4/2000 | Perriello |
| 6,110,372 A | 8/2000 | Perriello |
| 6,156,203 A | 12/2000 | Anthony |
| 6,183,644 B1 | 2/2001 | Adams et al. |
| 6,210,579 B1 | 4/2001 | Perriello |
| 6,217,766 B1 | 4/2001 | Stetter et al. |
| 6,244,346 B1 | 6/2001 | Perriello |
| 6,245,235 B1 | 6/2001 | Perriello |
| 6,303,366 B1 | 10/2001 | Steffan et al. |
| 6,306,302 B1 | 10/2001 | Maree et al. |
| 6,322,700 B1 | 11/2001 | Suthersan |
| 6,361,694 B1 | 3/2002 | Trost |
| 6,383,388 B1 | 5/2002 | Krauter et al. |
| 6,391,209 B1 | 5/2002 | Belongia et al. |
| 6,488,850 B2 | 12/2002 | Perriello |

OTHER PUBLICATIONS

Little et al., "Trichloroethylene Biodegradation by a Methane–Oxidizing Bacterium," *Applied and Environmental Microbiology*, Apr. 1988, p. 951–956, vol. 54.

Arciero et al., "Degradation of Trichloroethylene by the Ammonia–Oxidizing Bacterium *Nitrosomonas europaea*," *Biochemical and Biophysical Research Communications*, Mar. 15, 1989; p. 640–643, vol. 159, No. 2.

Oldenhuis et al., "Degradation of Chlorinated Aliphatic Hydrocarbons by *Methylosinus trichosporium* OB3b Expressing Soluble Methane Monooxygenase," *Applied and Environmental Microbiology*, Nov. 1989; p. 2819–2826, vol. 55, No. 11.

Tsien et al., "Biodegradation of Trichloroethylene by *Methylosinus trichosporium* OB3b," *Applied and Environmental Microbiology*, Dec. 1989; p. 3155–3161, vol. 55, No. 12.

Vannelli et al., "Degradation of Halogenated Aliphatic Compounds by the Ammonia–Oxidizing Bacterium *Nitrosomonas europaea*", *Applied and Environmental Microbiology*, Apr. 1990; p. 1169–1171, vol. 56, N. 4.

Folsom et al. "Phenol and Trichloroethylene Degradation by *Pseudomonas cepacia* G4: Kinetics and Interactions Between Substrates," *Applied and Environmental Microbiology*, May 1990; p. 1279–1285, vol. 56, No. 5.

Broholm et al., "Toxicity of 1,1,1–Trichloroethane and Trichloroethene on a Mixed Culture of Methane–Oxidizing Bacteria", *Applied and Environmental Microbiology*, Aug. 1990, p. 2488–2493, vol. 56, No. 8.

Henry et al., "Influence of Endogenous and Exogenous Electron Donors and Trichloroethylene Oxidation Toxicity on Trichloroethylene Oxidation by Methanotrophic Cultures from a Groundwater Aquifer," *Applied and Environmental Microbiology*, Jan. 1991; p. 236–244, vol. 57, No. 1.

Oldenhuis et al., "Kinetics of Chlorinated Hydrocarbon Degradation by *Methylosinus trichosporium* OB3b and Toxicity of Trichloroethylene," *Applied and Environmental Microbiology*, Jan. 1991; p. 7–14, vol. 57, No. 1.

Alvarez–Cohen et al., "Product Toxicity and Cometabolic Competitive Inhibition Modeling of Chloroform and Trichloroethylene Transformation by Methanotrophic Resting Cells," *Applied Environmental Microbiology*, Apr. 1991; p. 1031–1037, vol. 57, No 4.

Büyüksönmez et al., "Optimization of Simultaneous Chemical and Biological Mineralization of Perchoethylene," *Applied and Environmental Microbiology*, Jun. 1999; p. 2784–2788, vol. 65, No. 6.

Maymó–Gatell et al., "Reductive Dechlorination of Chlorinated Ethenes and 1,2–Dichloroethane by '*Dehalococcoides ethenogenes*' 195," *Applied and Environmental Microbiology*, Jul. 1999; p. 3108–3113, vol. 65, No. 7.

Hamamura et al., "Diversity in Butane Monooxygenases Among Butane–Grown Bacteria," *Applied and Environmental Microbiology*, Oct. 1999; p. 4586–4593, vol. 65, No. 10.

Löffler et al., "16S rRNA Gene–Based Detection of Tetrachloroethene–Dechlorinating Desulfuromonas and Dehalococcoides Species," *Applied and Environmental Microbiology*, Apr. 2000; p. 1369–1374, vol. 66, No. 4.

Fogel et al., Biodegradation of Chlorinated Ethenes by Methane–Utilizing Mixed Culture, *Applied and Environmental Microbiology*, Apr. 1986, pp 720–724, vol. 51, No. 4.

Wackett et al., Survey of Microbial Oxygenases: Trichloroethylene Degradation by Propane–Oxidizing Bacteria, *Applied and Environmental Microbiology*, Nov. 1989, pp 2960–2964, vol. 55, No. 11.

Fox, Status and Trends in Bioremediation Treatment Technology, *Remediation*, Summer 1991, pp 293–303.

Alvarez–Cohen et al., Characterization of a Methane–Utilizing Bacterium from a Bacterial Consortium That Rapidly Degrades Trichloroethylene and Chloroform, *Applied and Environmental Microbiology*, Jun. 1992, pp 1886–1893, vol. 58, No.6.

Chang et al., Transformation Capacities of Chlorinated by Mixed Cultures Enriched on Methane, Propane, Toluene, or Phenol, *Biotechnology and Bioengineering*, Nov. 9, 1994, pp 440–449, vol. 45.

Kim et al., Aerobic Cometabolism of Chloroform and 1,1, 1–Trichloroethane by Butane–Grown Microorganisms, *Bioremediation Journal*, 1997, pp 135–148, vol. 1, No. 2.

Hamamura et al., Chloroform Cometabolism by Butane–Grown CF8, *Pseudomonas butanovora*, and *Mycobacterium vaccae* JOB5 and Methane–Grown *Methylosinus trichosporium* OB3b, *Applied and Environmental Microbiology*, Sep. 1997, pp 3607–3613, vol. 63, No. 9.

Steffan et al., Biodegradation of the Gasoline Oxygenates Methyl tert–Butyl Ether, Ethyl tert–Butyl Ether, and tert–Amyl Methyl Ether by Propane–Oxidizing Bacteria, *Applied and Environmental Microbiology*, Nov. 1997, pp 4216–4222, vol. 63, No. 11.

De Bruin et al., "Complete Biological Reductive Transformation of Tetrachloroethene to Ethane", *Applied and Environmental Microbiology*, Jun. 1992, p. 1996–2000, vol. 58, No. 6. [Abstract].

Mohn et al., "Reductive Dehalogenation of Chlorophenols by *Desulfomonile tiedjei* DCB–1", *Applied and Environmental Microbiology*, Apr. 1992, p. 1367–1370, vol. 58, No. 4. [Abstract].

So et al., "Initial Reactions in Anaerobic Alkane Degradation by a Sulfate Reducer, Strain AK–01", *Applied and Environmental Microbiology*, Dec. 1999, p. 5532–5540, vol. 65, No. 12. [Abstract].

Haggblom et al., "Influence of Alternative Electron Acceptors on the Anaerobic Biodegradability of Chlorinated Phenols and Benzoic Acids," *Applied and Environmental Microbiology*, Apr. 1993; p. 1162–1167, vol. 59, No. 4, [Abstract].

Ramanand et al., "Reductive Dehalogenation of Chlorinated Benzenes and Toluenes Under Methanogenic Conditions," *Applied and Environmental Microbiology*, Oct. 1993; p. 3266–3272, vol. 59, No. 10. [Abstract].

Coates et al., "Anaerobic Degradation of Polycyclic Aromatic Hydrocarbons and Alkanes in Petroleum–Contaminated Marine Harbor Sediments", *Applied and Environmental Microbiology*, Sep. 1997, p. 3589–3593, vol. 63, No. 9. [Abstract].

So et al., "Isolation and Characterization of a Sulfate–Reducing Bacterium that Anaerobically Degrades Alkanes", *Applied and Environmental Microbiology*, Jul. 1999, p. 2969–2976, vol. 65, No. 7. [Abstract].

Laue et al., "Taurine Reduction in Anaerobic Respiration of *Bilophila wadsworthia* RZATUA", *Applied and Environmental Microbiology*, May 1997, p. 2016–2021, vol. 63, No. 5. [Abstract].

Wischnak et al., "*Pseudomonas* sp. Strain 273, an Aerobic α,ω–Dichloroalkane Degrading Bacterium", *Applied and Environmental Microbiology*, Sep. 1998, p. 3507–3511, vol. 64, No. 9. [Abstract].

Ye et al., "Anaerobic Dechlorination of Polychlorobiphenyls (Aroclor 1242) by Pasteurized and Ethanol–Treated Microorganisms from Sediments", *Applied and Environmental Microbiology*, Apr. 1992, p. 1110–1114, vol. 58, No. 4, [Abstract].

Wiegel et al., "Anaerobic Dehalogenation of Hydroxylated Polychlorinated Biphenyls by *Desulfitobacterium dehalogenans*", *Applied and Environmental Microbiology*, May 1999, p. 2217–2221, vol. 65, No. 5. [Abstract].

Wu et al., "Establishment of a Polychlorinated Biophenyl–Dechlorinating Microbial Consortium, Specific for Doubly Flanked Chlorines, in a Defined, Sediment–Free Medium", *Applied and Environmental Microbiology*, Jan. 2000, p. 49–53, vol. 66, No. 1. [Abstract].

Miguez et al., "Monitoring Methanotrophic Bacteria in Hybrid Anaerobic–Aerobic Reactors with PCR and a Catabolic Gene Probe", *Applied and Environmental Microbiology*, Feb. 1999, p. 381–388, vol. 65, No. 2. [Abstract].

Bedard et al., "Brominated Biphenyls Prime Extensive Microbial Reductive Dehalogenation of Aroclor 1260 in Housatonic River Sediment", *Applied and Environmental Microbiology*, May 1998, p. 1786–1795, vol. 64, No. 5. [Abstract].

Wu et al., "Microbial Reductive Dechlorination of Aroclor 1260 in Anaerobic Slurries of Estuarine Sediments", *Applied and Environmental Microbiology*, Mar. 1998, p. 1052–1058, vol. 64, No. 3. [Abstract].

Sanford et al., "Characterization of *Desulfitobacterium chlororespirans* sp. nov., Which Grows by Coupling the Oxidation of Lactate to the Reductive Dechlorination of 3–chloro–4–hydroxybenzoate", *Applied and Environmental Microbiology*, Oct. 1996, p. 3800–3808, vol. 62, No. 10. [Abstract].

Nicholson et al., "Reductive Dechlorination of Chlorophenols by a Pentachlorophenol–Acclimated Methanogenic Consortium", *Applied and Environmental Microbiology*, Jul. 1992, p. 2280–2286, vol. 58, No. 7. [Abstract].

Von Wintzingerode et al., "Phylogenetic Analysis of an Anerobic, Trichlorobenzene–Transforming Microbial Consortium", *Applied and Environmental Microbiology*, Jan. 1999, p. 283–286, vol. 65, No. 1. [Abstract].

Bedard et al., "Complete Reductive Dehalogenation of Brominated Biphenyls by Anaerobic Microorganisms in Sediment", *Applied and Environmental Microbiology*, Mar. 1998, p. 940–947, vol. 64, No. 3. [Abstract].

Van Eekert et al., "Degradation and Fate of Carbon Tetrachloride in Unadapted Methanogenic Granular Sludge", *Applied and Environmental Microbiology*, Jul. 1998, p. 2350–2356, vol. 64, No. 7. [Abstract].

Bradley et al., "Anaerobic Oxidation of [1,2–$^{14}$C]Dichloroethene Under Mn(IV)–Reducing Conditions", *Applied and Environmental Microbiology*, Apr. 1998, p. 1560–1562, vol. 64, No. 4. [Abstract].

Fish et al., "Biotransformation of Aroclor 1242 in Hudson River Test Tube Microcosms", *Applied and Environmental Microbiology*, Dec. 1994, p. 4289–4296, vol. 60, No. 12. [Abstract].

Locher et al., "Uptake of 4–Toluene Sulfonate by *Comamonas testosteroni* T–2", *J. Bacteriol.*, Feb. 1993, p. 1075–1080, vol. 175, No. 4. [Abstract].

Sun et al., "Isolation and Characterization of *Desulfovibrio dechloroacetivorans* sp. nov., a Marine Dechlorinating Bacterium Growing by Coupling the Oxidation of Acetate to the Reductive Dechlorination of 2–Chlorophenol", *Applied and Environmental Microbiology*, Jun. 2000, p. 2408–2413, vol. 66, No. 6. [Abstract].

Boyle et al., "Isolation from Estaurine Sediments of a Desulfovibrio Strain Which Can Grow on Lactate Coupled to the Reductive Dehalogenation of 2,4,6–Tribromophenol", *Applied and Environmental Microbiology*, Mar. 1999, p. 1133–1140, vol. 65, No. 3. [Abstract].

Cole et al., "Isolation and Characterization of a Novel Bacterium Growing Via Reductive Dehalogenation of 2–Chlorophenol", *Applied and Environmental Microbiology*, Oct. 1994, p. 3536–3542, vol. 60, No. 10. [Abstract].

Dojka et al., "Microbial Diversity in a Hydrocarbon– and Chlorinated–Solvent–Contaminated Aquifer Undergoing Intrinsic Bioremediation", *Applied and Environmental Microbiology*, Oct. 1998, p. 3869–3877, vol. 64, No. 10. [Abstract].

Hur et al., "Metabolism of Chlorofluorocarbons and Polybrominated Compounds by *Pseudomonas putida* G786(pHG–2) via an Engineered Metabolic Pathway", *Applied and Environmental Microbiology*, Nov. 1994, p. 4184–4154, vol. 60, No. 11. [Abstract].

EPA, "Sequential Anaerobic/Aerobic Biodegradation of PCE at Watertown, Massachusetts", Cost and Performance Report, Mar. 2000.

Holliger et al., "A Highly Purified Enrichment Culture Couples the Reductive Dechlorination of Tetrachloroethene to Growth", *Applied and Environmental Microbiology*, Sep. 1993, p. 2991–2997, vol. 59. No. 9. [Abstract].

Madsen et al., "Isolation and Characterization of an Anaerobic Chlorophenol–Transforming Bacterium", *Applied and Environmental Microbiology*, Sep. 1992, p. 2874–2878, vol. 58, No. 9. [Abstract].

Mohn et al., "Limited Degradation of Chlorophenols by Anaerobic Sludge Granules", *Applied and Environmental Microbiology*, Jul. 1992, p. 2131–2136, vol. 58, No. 7. [Abstract].

Baker et al., *Bioremediation*, pp. 303–304, McGraw–Hill, Inc., 1994.

www.biobutane.com/may2000.htm (downloaded on Nov. 18, 2002) dated May 1, 2000.

www.biobutane.com/mar.2000.htm (downloaded on Nov. 18, 2002) dated Mar. 1, 2000.

Global BioSciences, Inc. Powerpoint® brand audiovisual presentation (downloaded from web on Nov. 18, 2002) (undated).

Air & Waste Management Association Show New Products information sheet (posted Jun. 25, 1999) at www.pollution-engineering.com/events/conferences/awma99/awmanp6.htm (downloaded Nov. 18, 2002).

* cited by examiner

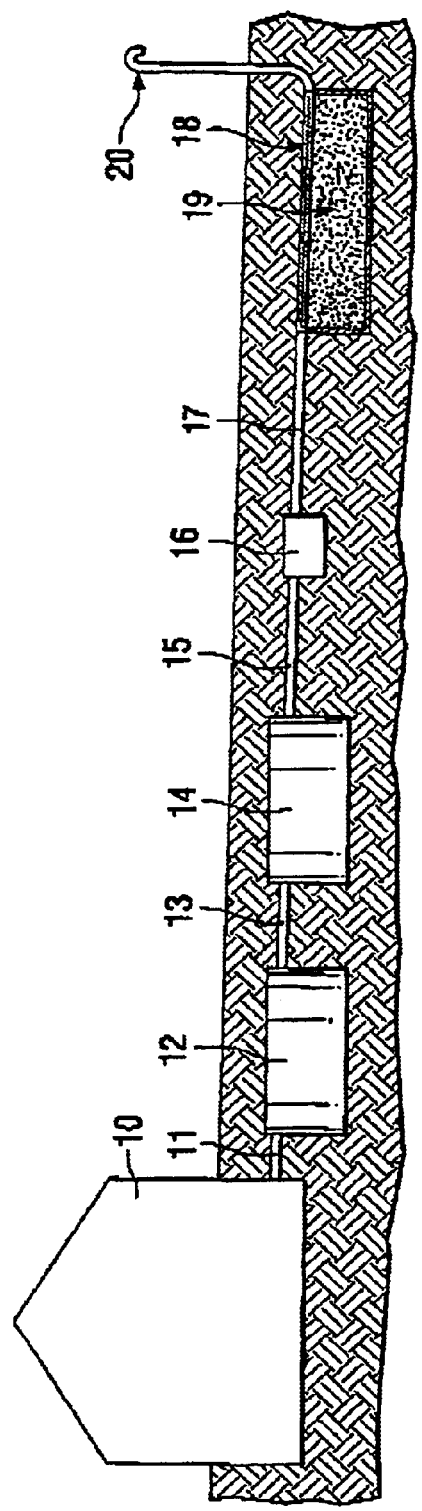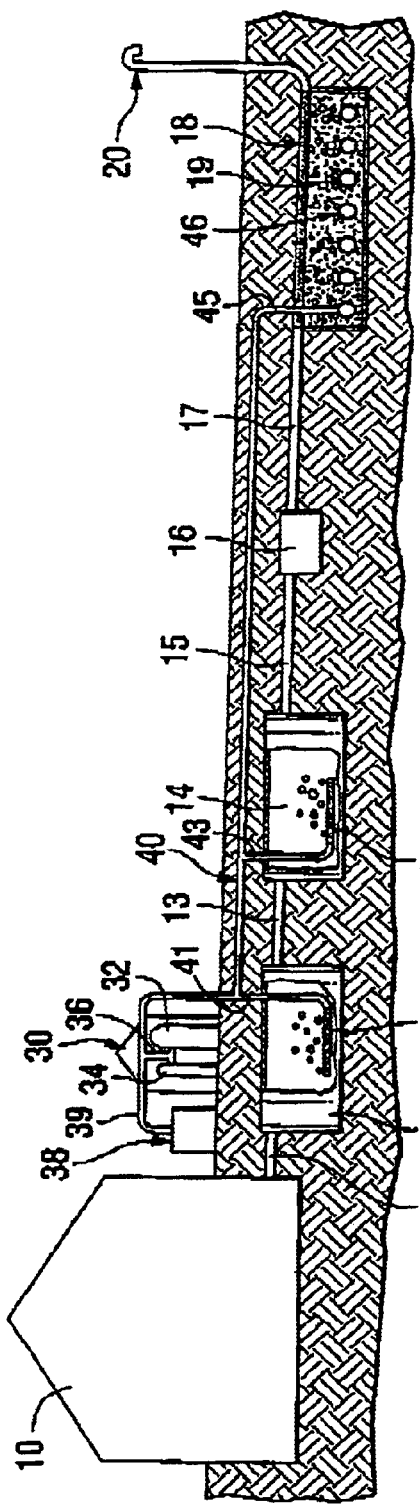

METHOD AND APPARATUS FOR TREATMENT OF SEPTIC SYSTEMS WITH ALKANE-UTILIZING BACTERIA

CROSS REFERENCE TO RELATED APPLICATIONS

This application claims the benefit of U.S. Provisional Application Ser. No. 60/344,947 filed Dec. 21, 2001. This application is a continuation-in-part of U.S. patent application Ser. No. 10/308,607 filed Dec. 2, 2002, which is a continuation-in-part of U.S. patent application Ser. No. 09/924,791 filed Aug. 8, 2001 now U.S. Pat. No. 6,669,846, which claims the benefit of U.S. Provisional Application Ser. No. 60/291,165 filed May 15, 2001. These applications are incorporated herein by reference.

FIELD OF THE INVENTION

The present invention relates to the treatment of wastewater septic systems with aerobic and/or anaerobic alkane-utilizing bacteria.

BACKGROUND INFORMATION

Septic systems provide on-site wastewater management for individual residences and other establishments. Typical septic systems may include at least some of the following components: septic tanks, grease and oil interceptor tanks, Imhoff tanks, drain or leach fields, disposal beds and pits, intermittent sand filters, recirculating granular-medium filters, shallow-trench sand-filled pressure-dosed disposal fields, mound systems, complete recycle units and graywater systems.

Septic systems are often used for residential wastewater treatment. As more people move to rural and suburban areas not serviced by municipal or community sanitary sewers, the solution for the treatment of household waste continues to be on-site sewage disposal. Wastewater may also be generated at housing units, public facilities and commercial establishments such as restaurants. Waste includes fats and oils, grease, sludge, human waste, food/garbage disposal waste, paper products and laundry effluent.

Conventional wastewater treatment processes are microbiologically mediated. Naturally occurring anaerobic bacteria breakdown and digest the solid waste that falls to the bottom of the septic tank. The microbial processes acting on the solids in the tank may reduce the solids to gases and fine particles. These small solid particles, as well as the oils and greases, float on the surface of the tank and form a scum layer. In the process of floating to the top of the tank, some of the small solid particles, oils, and greases are forced out by the flow of water into the outlet baffle leading into the drainfield. With time, the buildup of small solid particles, oils and greases, and soaps, can cause serious problems in the drainfield.

During normal operation, septic systems fail due to clogging. For example, clogging can occur in septic tanks, grease and oil interceptor tanks and drainfields, including the piping of such systems. The clogging may be caused by, e.g., biomass buildup or grease buildup. Clogged drainfields are a common and expensive problem facing septic system owners.

In addition to clogging problems, decomposing wastes in conventional septic tanks may produce toxic gases such as hydrogen sulfide under anaerobic conditions. In addition to being a potential health hazard, hydrogen sulfide can be corrosive to tanks and piping networks. Another disadvantage of conventional septic systems is that household chemicals flushed down a toilet or sink can contaminate a drainfield and the subsurface soils and groundwater, resulting in a wide spread contaminant plume and significant liability for the property owner. Contaminated drainfields are very expensive to remediate using conventional treatment technologies.

Industrial wastewater and municipal wastewater have been conventionally treated by the introduction of air or oxygen bubbles. The addition of micro bubbles of air or oxygen provides enhanced aerobic treatment of industrial and municipal wastewater to lower biological oxygen demand (BOD), total dissolved solids (TDS) and total organic carbon (TOC).

The bioremediation of various pollutants such as chlorinated solvents and other types of pollutants using butane-utilizing bacterial is disclosed in U.S. Pat. Nos. 5,888,396, 6,051,130, 6,110,372, 6,156,203, 6,210,579, 6,245,235 and 6,488,850, which are incorporated herein by reference.

SUMMARY OF THE INVENTION

The present invention provides methods and apparatus for treatment of septic systems with alkanes. In a preferred embodiment, butane, having the highest solubility of all the alkanes, can be used to control, for example, septic system BOD, TOC and TDS through enhanced growth of aerobic and/or anaerobic bacteria and other microorganisms that oxidize (or reduce) dissolved organic matter and sludge effluents. For example, sludge and BOD of septic system wastestreams may be significantly decreased. In addition, pollutants found in the septic system wastewater may be remediated by the alkane-utilizing bacteria.

An embodiment of the present invention provides enhanced aerobic treatment of wastewater effluent from houses, housing units, public facilities and commercial establishments such as restaurants by introducing alkane(s) and oxygen-containing gas into a treatment vessel, such as a septic tank or other portion of a septic system, thereby providing an aerobic bioreactor. The creation of an aerobic environment avoids the generation of hydrogen sulfide, and can extend the life of septic tanks and piping systems. In addition, the alkane(s) and oxygen-containing gas may be injected into a drainfield to improve field performance, or into oil and grease interceptor tanks to reduce the solids content.

Another embodiment of the present invention provides enhanced anaerobic treatment of septic system wastewater by introducing an alkane(s) into a treatment vessel to stimulate the growth of anaerobic bacteria to thereby provide an anaerobic bioreactor.

A further embodiment of the present invention is to use alkanes, e.g., methane, ethane, propane and butane, to effectively degrade compounds such as pollutants typically found in small on-site wastewater treatment systems. Additionally, butane with or without air (oxygen) may be used to remediate contaminated leach fields.

An aspect of the present invention is to provide a method of treating septic system wastewater comprising introducing at least one alkane into wastewater contained in the septic system.

Another aspect of the present invention is to provide a method of treating material contained in septic system wastewater, the method comprising stimulating growth of alkane-utilizing bacteria, and allowing the alkane-utilizing bacterial to degrade at least a portion of the septic system wastewater material.

A further aspect of the present invention is to provide an apparatus for treating septic system wastewater comprising means for introducing at least one alkane into wastewater contained in the septic system.

Another aspect of the present invention is to provide an apparatus for treating septic system wastewater comprising a septic system wastewater containment vessel, and at least one alkane injector in flow communication with the septic system wastewater containment vessel.

These and other aspects of the present invention will be more apparent from the following description.

BRIEF DESCRIPTION OF THE DRAWINGS

FIG. 1 is a partially schematic elevation view of a conventional on-site septic system.

FIG. 2 is a partially schematic elevation view of a butane enhanced on-site septic system in accordance with an embodiment of the present invention.

DETAILED DESCRIPTION

The present invention utilizes alkanes, preferably butane, under aerobic and/or anaerobic conditions to enhance septic system wastewater treatment processes. Butane is highly soluble and ideally suited to serve as a microbial growth substrate which significantly increases the heterogeneous microbial community and total heterotrophic microbial population found in septic system wastewater. The enhanced microbial population may rapidly absorb and mineralize the dissolved organic nutrients in the septic system wastestream.

A common type of septic system that may be treated in accordance with the present invention includes a septic tank and soil absorption system. For example, the septic system may consist of a septic tank, distribution box, and a gravel-filled absorption field installed below the soil surface. A typical process flow occurs as follows: (1) Household wastes are collected in the septic tank; (2) The septic tank retains the wastewater for approximately 24 hours, allowing the solids to separate and settle out. This allows bacteria to partially decompose and liquefy the solids; (3) A scum layer, comprising fats and oils, floats on the surface of the wastewater; (4) Heavy, partially decomposed solids, sludge, are retained in the septic tank and must be pumped out periodically; (5) The partially treated liquid, called effluent, flows out of the septic tank to the distribution box, where it is evenly distributed throughout the absorption field; and (6) As the effluent moves through the soil, impurities and pathogens are removed. In addition to the foregoing septic system components, many restaurants install grease and oil interceptor tanks located before the septic tank.

The alkane injection system may be used at a single location in the septic system, or at multiple locations. In one embodiment, butane and air may be injected into a septic tank. In another embodiment, butane and air may be used to treat wastes in a drainfield. In a further embodiment, butane and air may be used to treat wastes in an oil or grease interceptor tank. In another embodiment, butane may be used without air or oxygen to improve and accelerate anaerobic treatment processes. For example, butane injection may be used to enhance anaerobic breakdown of fatty acids, alcohols and other byproducts of anaerobic fermentation in a sludge digester.

Septic tank and drainfield performance may be enhanced by periodic or continuous injection of alkane(s) and oxygen-containing gas to enhance aerobic breakdown of waste. The alkane(s) and oxygen-containing gas may be injected together or separately. Alternatively, alkane injection without an oxygen-containing gas into a septic tank or drainfield may enhance anaerobic degradation processes, thereby accelerating sludge decomposition and removal. Aerobic and anaerobic cycles may be used. Alkane and oxygen-containing gas injection equipment may be retrofitted to existing septic tanks and other small on-site structures such as grease and oil interceptor tanks and piping.

As used herein, the term "butane substrate" includes liquids and gases in which butane is present in sufficient amounts to stimulate substantial growth of butane-utilizing bacteria. The butane substrate may be supplied, for example, from a butane cylinder. Butane is preferably the most prevalent compound of the butane substrate on a weight percent basis, and typically comprises at least about 10 weight percent of the butane substrate. The other constituents of the butane substrate may include other alkanes such as methane, ethane and propane, or other bacterial food sources. The butane substrate preferably comprises at least about 50 weight percent butane. More preferably, the butane substrate comprises at least about 90 weight percent butane. In a particular embodiment, the butane substrate comprises at least about 99 weight percent n-butane. The butane may contain straight (n-butane) and/or branched chain compounds such as iso-butane. Injected butane bubbles can vary in size from large-diameter bubbles to micro-sized bubbles. Although the use of butane is primarily described herein, it is to be understood that other alkanes such as methane, ethane, propane and mixtures thereof may be used in accordance with the present invention. For example, the alkanes may be provided in the form of natural gas.

The oxygen-containing gas may be injected into the septic system in the form of air, a gas stream with varying concentrations of oxygen, or pure oxygen. For example, injected air may be dry air (20.90% oxygen). In one embodiment, the oxygen-containing gas may be provided by an air compressor. For many septic systems, a relatively small air compressor may be satisfactory.

To accelerate the dissolved organic nutrient reductions, the butane may be pulsed into the wastestream to create feeding frenzy/starvation cycles. Such cycles may adapt microbial populations to a wide range of carbon sources of differing bioavailabilities found in septic systems. After the initial growth phase, the organic matter available in the wastewater effluent will be rapidly decreased thereby reducing the BOD, TOC and TDS. In addition to BOD and TDS, the butane/air process may remove pollutants such as halogenated hydrocarbons, ammonia, nitrates, nitrites, phosphorus, total organic carbon, organic and mineral settleable and nonsettleable suspended solids, organic and mineral colloidal and dissolved filterable solids and sludge.

FIG. 1 is a partially schematic elevation view of a conventional on-site septic system. The septic system is fed from a house 10 or other facility such as a housing unit, public facility or commercial establishment such as a restaurant. Wastewater from the house 10 flows through an underground pipe 11 to a grease/oil interceptor tank 12. A pipe 13 connects the grease/oil interceptor tank 12 to a septic tank 14. Alternatively, the tank 14 may be an Imhoff tank. A pipe 15 connects the septic tank 14 to a distribution box 16. Another pipe 17 connects the distribution box 16 to a drainfield including a perforated pipe 18 above drain rock 19. A vent 20 may optionally be provided at the drainfield.

In accordance with the present invention, a butane substrate is injected into the septic system wastewater in at least one treatment vessel equipped with oxygen injectors and, optionally, turbulent mixing devices. FIG. 2 is a partially schematic elevation view of a butane enhanced on-site septic system in accordance with an embodiment of the present invention. The septic system shown in FIG. 2 is similar to that shown in FIG. 1, with the addition of a butane/air injection system 30. The injection system 30 includes a butane cylinder 32 and a pusher gas cylinder 34 connected by a regulator valve 36. The pusher gas contained in the cylinder 34 may be any suitable inert gas such as nitrogen or helium. An air compressor 38 is connected by an air delivery line 39 to the outflow from the regulator valve 36. A butane/air piping network 40 is connected to the butane/air injection system 30. In the embodiment shown in FIG. 2, a branch 41 of the butane/air injection network 40 is connected to a perforated tube 42 for injection of the butane/air mixture into the grease/oil interceptor tank 12. Another branch 43 of the butane/air distribution network 40 is connected to a perforated pipe 44 which injects the butane/air mixture into the septic tank 14. A further branch 45 of the butane/air distribution network 40 is connected to multiple perforated pipes 46 embedded in the drain rock 19 of the drainfield.

In the embodiment shown in FIG. 2, the butane/air mixture is injected into the grease/oil interceptor tank 12, the septic tank 14 and the drainfield 18/19. Alternatively, the butane/air mixture may be introduced at any other number of stages of the septic system. For example, the butane/air mixture may only be introduced into the septic tank 12, or into the drainfield 18, 19. Furthermore, although both the butane and air are supplied through the distribution network 40 shown in FIG. 2, the butane and air may be supplied through separate injection systems. Furthermore, the butane and air may be delivered together as a mixture, or may be delivered sequentially through the distribution network 40. For anaerobic processes, the air compressor 38 may either be shut off, or eliminated.

The present invention may be used to reduce fats and oils, grease, sludge, human wastes, BOD, TOC, settleable solids, dissolved solids, food/garbage disposal wastes, paper products, soap/laundry effluent and the like found in septic system waste streams. For example, a butane/air process may be used to treat BOD, TOC, ammonia, nitrates, nitrites, phosphorus, total organic carbon, organic and mineral settleable and nonsettleable suspended solids, organic and mineral colloidal and dissolved filterable solids and sludge contained in septic system waste streams. The butane/air process may also be used to treat sludge and solids contaminated with nitrogen-based aromatics (explosives), PCBs, pesticides, chlorinated aliphatic and aromatic compounds, aliphatic and aromatic hydrocarbons, and PAHs, esters, ethers, aldehydes, amines, dioxin-and related compounds, herbicides, ketones, phenols, sulfur-containing organics and alcohols, ethylene dibromide (EDB), chlorophenolic compounds (chlorophenols, chloroguiacols, and chlorocatechols, pulp mill effluent, low-level radioactive wastes, chlorate (pulp bleaching), cyanide, arsenic, chromium, copper, iron, lead, and other metals.

If the septic system wastestream includes hydrocarbon pollutants, such pollutants may also be remediated by the present system. Some of the hydrocarbon pollutants which may be degraded by the present system and method include, for example, chlorinated aliphatics, chlorinated aromatics and non-chlorinated aromatics and aliphatics. Specific hydrocarbon pollutants include trichloroethene (TCE), trichloroethane (TCA) (e.g., 1,1,2-trichloroethane and 1,1,1-trichloroethane), methylene chloride, 1,1-dichloroethane, chloroform, 1,2-dichloropropane, dibromochloromethane, 2-chloroethylvinyl ether, tetrachloroethene (PCE), chlorobenzene, 1,2-dichloroethane, bromodichloromethane, trans-1,3-dichloropropene, cis-1,3-dichloropropene, bromoform, chloromethane, bromomethane, vinyl chloride, chloroethane, 1,1-dichloroethene, trans-1,2-dichloroethene, methyl tertiary butyl ether (MTBE), polychlorinated biphenyl (PCB), dichlorobenzenes, cis-1,2-dichloroethene, dibromomethane, 1,4-dichlorobutane, 1,2,3-trichloropropane, bromochloromethane, 2,2-dichloropropane, 1,2-dibromoethane, 1,3-dichloropropane, bromobenzene, chlorotoluenes, trichlorobenzenes, trimethylbenzenes, trans-1,4-dichloro-2-butene and butylbenzenes. Additional pollutants include petroleum compounds such as crude oil, refined oil, Nos. 2, 4 and 6 fuel oils, gasoline, benzene, toluene, ethylbenzene and xylene (BTEX), and creosote.

Alkane-utilizing bacteria may degrade pollutants aerobically (or anaerobically), e.g., through direct metabolism, sequential metabolism, reductive metabolism, dehalogenation or cometabolism. Bacteria that may be suitable for use in the present septic system treatment process include the following Groups (in addition to fungi, algae, protozoa and rotifers):

| Group 1: | The Spirochetes |
|---|---|
| Group 2: | Aerobic/Microaerophilic, motile, helical/vibroid, gram-negative bacteria |
| Group 3: | Nonmotile (or rarely motile), gram-negative bacteria |
| Group 4: | Gram-negative aerobic/microaerophilic rods and cocci |
| Group 5: | Facultatively anaerobic gram-negative rods |
| Group 6: | Gram-negative, anaerobic, straight, curved, and helical bacteria |
| Group 7: | Dissimilatory sulfate- or sulfur-reducing bacteria |
| Group 8: | Anaerobic gram-negative cocci |
| Group 10: | Anoxygenic phototrophic bacteria |
| Group 11: | Oxygenic phototrophic bacteria |
| Group 12: | Aerobic chemolithotrophic bacteria and associated organisms |
| Group 13: | Budding and/or appendaged bacteria |
| Group 14: | Sheathed bacteria |
| Group 15: | Nonphotosynthetic, nonfruiting gliding bacteria |
| Group 16: | The fruiting, gliding bacteria and the Myxobacteria |
| Group 17: | Gram-positive cocci |
| Group 18: | Endospore-forming gram-positive rods and cocci |
| Group 19: | Regular, nonsporing, gram-positive rods |
| Group 20: | Irregular, nonsporing, gram-positive rods |
| Group 21: | The mycobacteria |
| Groups 22-29: | The actinomycetes |
| Group 22: | Nocardioform actinomycetes |
| Group 23: | Genera with multiocular sporangia |
| Group 24: | Actinoplanetes |
| Group 25: | Streptomycetes and related genera |
| Group 26: | Maduromycetes |
| Group 27: | Thermomonospora and related genera |
| Group 28: | Thermoactinomycetes |
| Group 29: | Genus Glycomyces, Genus Kitasatospira and Genus Saccharothrix |
| Group 30: | The Mycoplasmas - cell wall-less bacteria |
| Group 31: | The Methanogens |
| Group 32: | Archaeal sulfate reducers |
| Group 33: | Extremely halophilic, archaeobacteria (halobacteria) |
| Group 34: | Cell wall-less archacobacteria |
| Group 35: | Extremely thermophilic and hyperthermophilic $S^0$-metabolizers |

Facultative anaerobes and microaerophilic bacteria are capable of surviving at low levels of oxygen. They do not require strict anaerobic conditions such as the obligate anaerobes. Acidophilic, alkaliphilic, anaerobe, anoxygenic, autotrophic, chemolithotrophic, chemoorganotroph, chemotroph, halophilic, methanogenic, neutrophilic, phototroph, saprophytic, thermoacidophilic, and thermophilic bacteria may be used. Degradation of complex organic pollutants in the septic system may require the interaction of microbial populations (consortia).

Whereas particular embodiments of this invention have been described above for purposes of illustration, it will be evident to those skilled in the art that numerous variations of the details of the present invention may be made without departing from the invention.

What is claimed is:

1. A method of treating septic system wastewater comprising introducing at least one alkane into wastewater contained in the septic system.

2. The method of claim 1, further comprising introducing oxygen-containing gas into the septic system wastewater.

3. The method of claim 2, wherein the oxygen-containing gas is introduced in the form of air.

4. The method of claim 1, wherein the at least one alkane comprises butane.

5. The method of claim 4, wherein the butane stimulates the growth of butane-utilizing bacteria.

6. The method of claim 5, wherein the butane-utilizing bacteria comprise aerobic bacteria.

7. The method of claim 5, wherein the butane-utilizing bacteria comprise anaerobic bacteria.

8. The method of claim 1, wherein the at least one alkane comprises propane.

9. The method of claim 1, wherein the at least one alkane is provided in the form of natural gas.

10. A method of treating material contained in septic system wastewater, the method comprising:

stimulating growth of alkane-utilizing bacteria by introducing at least one alkane to the septic system wastewater; and allowing the alkane-utilizing bacteria to degrade at least a portion of the septic system wastewater material.

11. The method of claim 10, wherein the alkane-utilizing bacteria are grown in the septic system wastewater.

12. The method of claim 10, wherein the alkane-utilizing bacterial are grown by introducing butane into the septic system wastewater.

13. The method of claim 12, further comprising introducing oxygen-containing gas into the septic system wastewater.

14. The method of claim 13, wherein the oxygen-containing gas is introduced in the form of air.

15. The method of claim 12, wherein the butane stimulates the growth of butane-utilizing bacteria.

16. The method of claim 15, wherein the butane-utilizing bacteria comprise aerobic bacteria.

17. The method of claim 15, wherein the butane-utilizing bacteria comprise anaerobic bacteria.

18. The method of claim 10, wherein the at least one alkane comprises propane.

19. The method of claim 10, wherein the at least one alkane is provided in the form of natural gas.

20. An apparatus for treating septic system wastewater comprising means for introducing at least one alkane into wastewater contained in the septic system.

21. The apparatus of claim 20, further comprising means for introducing oxygen into the septic system wastewater.

22. The apparatus of claim 21, wherein the oxygen is introduced in the form of air.

23. The apparatus of claim 20, wherein the at least one alkane comprises butane.

24. The apparatus of claim 23, wherein the butane stimulates the growth of butane-utilizing bacteria.

25. The apparatus of claim 24, wherein the butane-utilizing bacteria comprise aerobic bacteria.

26. The apparatus of claim 24, wherein the butane-utilizing bacteria comprise anaerobic bacteria.

27. The apparatus of claim 20, wherein the at least one alkane comprises propane.

28. The apparatus of claim 20, wherein the at least one alkane is provided in the form of natural gas.

29. An apparatus for treating septic system wastewater comprising:

a septic system wastewater containment vessel; and at least one alkane injector in flow communication with the septic system wastewater containment vessel.

30. The apparatus of claim 29, further comprising at least one oxygen-containing gas injector in flow communication with the septic system wastewater containment vessel.

31. The apparatus of claim 29, wherein the septic system wastewater containment vessel comprises a septic tank.

32. The apparatus of claim 29, wherein the septic system wastewater containment vessel comprises a drainfield.

33. The apparatus of claim 29, wherein the septic system wastewater containment vessel comprises a grease and oil interceptor tank.

34. The apparatus of claim 29, wherein the septic system wastewater containment vessel comprises piping.

* * * * *

UNITED STATES PATENT AND TRADEMARK OFFICE
CERTIFICATE OF CORRECTION

| | | |
|---|---|---|
| PATENT NO. | : 6,835,312 B2 | Page 1 of 1 |
| APPLICATION NO. | : 10/324663 | |
| DATED | : December 28, 2004 | |
| INVENTOR(S) | : Felix Anthony Perriello, George A. DiCesare and Ralph J. Perriello | |

It is certified that error appears in the above-identified patent and that said Letters Patent is hereby corrected as shown below:

Title Page

PAGE 2 - Item [56] U.S. Patent Documents

"6,156,203 A 12/2000 Anthony" should read -- 6,156,203 A 12/2000 Perriello --

Other Publications Item [56]

"Aciero et al., "Degradation of Trichloroethylene by the Ammonia-Oxidizing Bacterium *Nitrosomonas europaea*," *Biochemical and Biophysical Research Communications*, Mar. 15, 1989; p. 640-643, vol. 159, No. 2."

should read

-- Aciero et al., "Degradation of Trichloroethylene by the Ammonia-Oxidizing Bacterium *Nitrosomonas Europaea*," *Biochemical and Biophysical Research Communications*, Mar. 15, 1989; p. 640-643, vol. 159, No. 2. --

Detailed Description

Column 6, Line 56
"Group 34: Cell wall-less archacobacteria" should read -- Group 34: Cell wall-less archaeobacteria --

Signed and Sealed this

Twenty-fourth Day of February, 2009

JOHN DOLL
*Acting Director of the United States Patent and Trademark Office*